(12) United States Patent
Danner et al.

(10) Patent No.: US 10,131,503 B2
(45) Date of Patent: Nov. 20, 2018

(54) ROTARY TO LINEARLY RECIPROCATING MOTION CONVERTER

(71) Applicants: Karen Sue Svejkovsky, Trustee of the Paul A. Svejkovsky Family Trust, Rockwall, TX (US); Karen Sue Svejkovsky, Trustee for the P.A. & K.S. Svejkovsky Living Trust, dated Jul. 9, 1997 as amended, Rockwall, TX (US)

(72) Inventors: Jason Lee Danner, Lantana, TX (US); Paul Blake Svejkovsky, Coppell, TX (US)

(73) Assignee: Karen Sue Svejkowsky, Rockwall, TX (US), Trustee of the Paul A. Svejkovaky Family Trust (*) Notice: Subject to any disclaimer, the term of this patent is extended or adjusted under 35 U.S.C. 154(b) by 0 days.

(21) Appl. No.: 15/607,179

(22) Filed: May 26, 2017

(65) Prior Publication Data
US 2018/0009608 A1 Jan. 11, 2018

Related U.S. Application Data

(63) Continuation-in-part of application No. 15/204,792, filed on Jul. 7, 2016, now Pat. No. 9,897,179.

(51) Int. Cl.
| F16H 19/02 | (2006.01) |
| B65G 27/10 | (2006.01) |
| B65G 27/18 | (2006.01) |
| F16H 37/12 | (2006.01) |
| E05F 15/603 | (2015.01) |

(52) U.S. Cl.
CPC ............ *B65G 27/18* (2013.01); *E05F 15/603* (2015.01); *F16H 37/124* (2013.01); *E05Y 2201/434* (2013.01); *E05Y 2201/716* (2013.01)

(58) Field of Classification Search
CPC ................................ F16H 19/02; B65G 27/10
USPC ......................... 198/750.1, 750.8; 74/27, 52
See application file for complete search history.

(56) References Cited

U.S. PATENT DOCUMENTS

| 2,445,613 | A | * | 7/1948 | Fincher | B07B 1/42 74/26 |
| 2,991,872 | A | * | 7/1961 | Keegan | B06B 1/10 198/766 |
| 4,339,029 | A | * | 7/1982 | Wilson | B65G 27/12 198/750.8 |
| 5,794,757 | A | * | 8/1998 | Svejkovsky | B65G 27/12 198/750.1 |

(Continued)

*Primary Examiner* — Douglas A Hess
(74) *Attorney, Agent, or Firm* — Patrick K. Steele

(57) ABSTRACT

A rotary to linearly reciprocating motion converter includes a case, a closure member engaging an opening of the case to dispose a pinion gear rotatably coupled to the closure member, the pinion gear having half the diameter as an interior ring gear of the case, and further includes a pinion shaft connected to the pinion gear on a first side of the closure member and to an inboard end of a crank arm on a second side of the closure member, the outboard end of the crank arm having a force transfer member aligned with a point on the periphery of the pinion gear. Rotation of the closure member relative to the case results in the force transfer member moving in a linearly reciprocating mode. The force transfer member may be coupled to a conveyor to reciprocate the conveyor as the closure member rotates.

5 Claims, 8 Drawing Sheets

(56) References Cited

U.S. PATENT DOCUMENTS

| | | | | |
|---|---|---|---|---|
| 5,850,906 | A * | 12/1998 | Dean | B65G 27/12 198/750.8 |
| 6,415,911 | B1 * | 7/2002 | Svejkovksy | B65G 27/12 198/750.1 |
| 6,435,337 | B1 * | 8/2002 | Sahlberg | B65G 25/04 198/766 |
| 6,598,733 | B2 * | 7/2003 | Kato | B65G 27/02 198/621.3 |
| 6,858,005 | B2 * | 2/2005 | Ohline | A61B 1/0053 600/139 |
| 7,387,198 | B2 * | 6/2008 | Thomson | B65G 27/20 198/760 |
| 7,416,658 | B2 * | 8/2008 | Hur | B01D 21/245 198/750.8 |
| 7,581,459 | B2 * | 9/2009 | Gourjon | B65G 25/04 198/750.8 |
| 7,650,986 | B2 * | 1/2010 | Kwasniewicz | B65G 27/12 198/750.8 |
| 8,066,114 | B2 * | 11/2011 | Svejkovsky | B65G 27/20 198/758 |
| 8,151,975 | B1 * | 4/2012 | Anderson | B65G 25/065 198/750.1 |
| 8,584,833 | B2 * | 11/2013 | Sandberg | B65G 27/12 198/750.1 |
| 8,721,253 | B1 * | 5/2014 | Ebeling | B65G 25/04 414/749.1 |
| 9,126,765 | B2 * | 9/2015 | Groenewald | B65G 27/28 |
| 9,897,179 | B2 * | 2/2018 | Danner | B65G 27/10 |

* cited by examiner

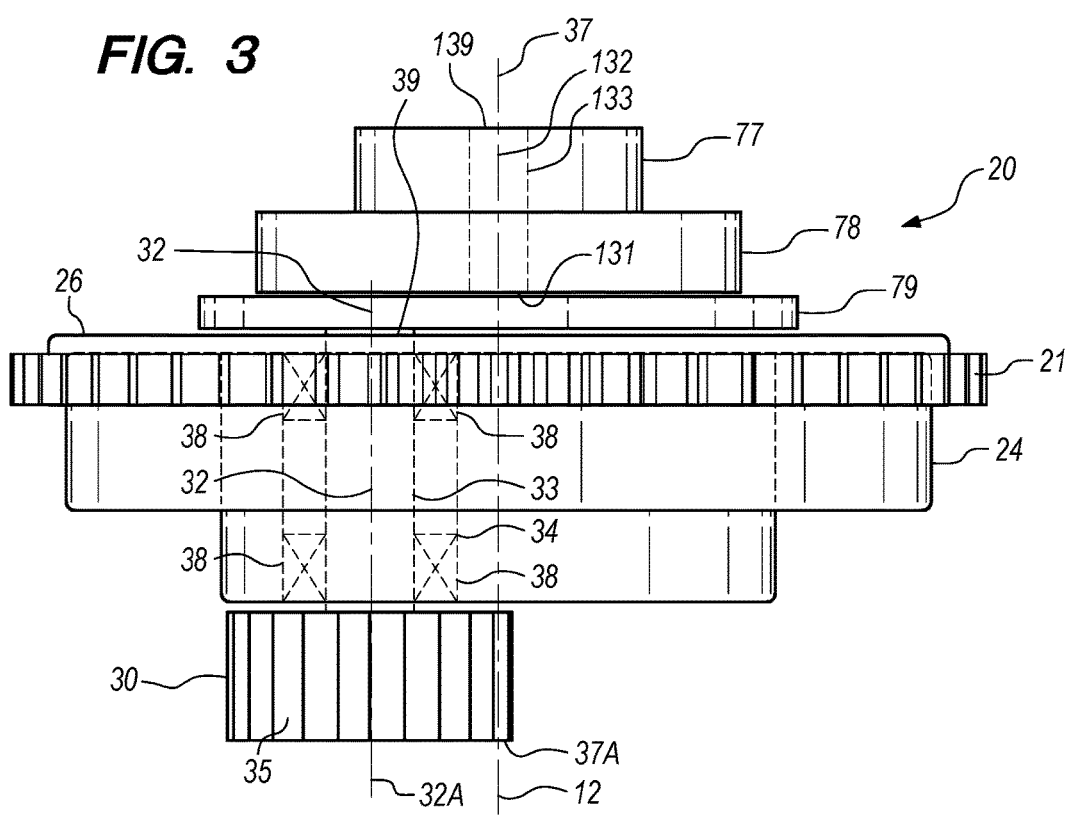
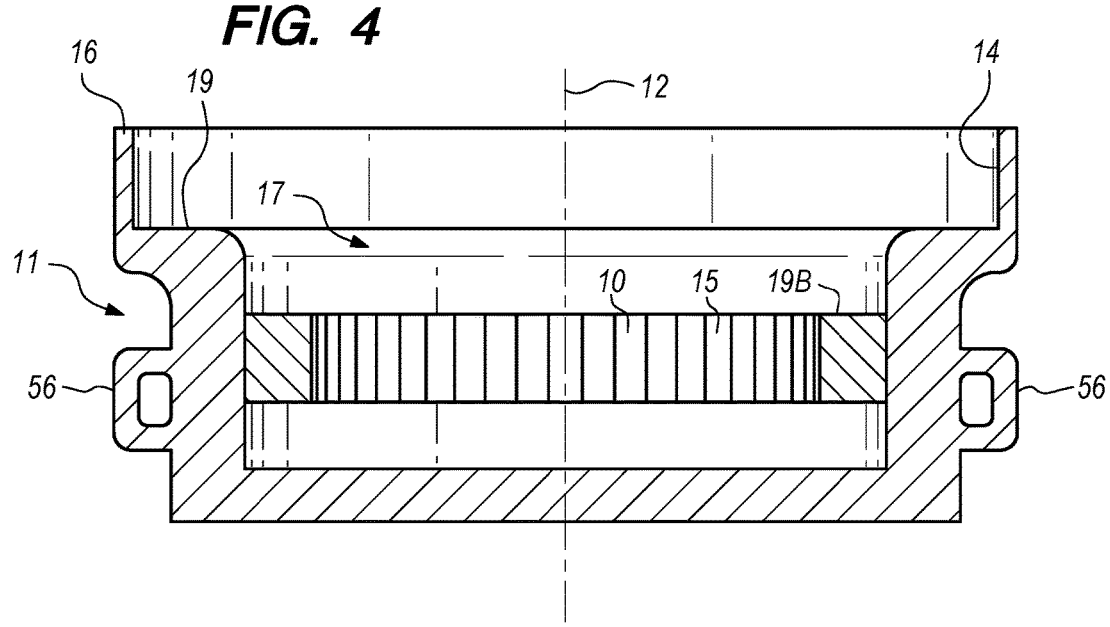

ROTARY TO LINEARLY RECIPROCATING MOTION CONVERTER

STATEMENT OF RELATED APPLICATIONS

This is a continuation-in-part application depending from and claiming priority to U.S. Non-Provisional application Ser. No. 15/204,792 filed on Jul. 7, 2016.

BACKGROUND

Field of the Invention

The present invention relates to an apparatus for converting rotary motion, such as from the shaft of a motor, to linearly reciprocating motion. More specifically, the present invention relates to an apparatus for converting rotary drive motion from a motor into linearly reciprocating motion to drive a reciprocating conveyor for moving goods within a facility.

Background of the Related Art

Differential impulse conveyors, such as that disclosed in Svejkovsky et al.'s U.S. Pat. No. 5,794,757, are one type of reciprocating structure available for moving articles along a smooth conveyor surface using differential impulse movement. An inspection of U.S. Pat. No. 5,794,757 shows the pivoting support legs (element numbers 18 and 22 in the '757 Patent) that sway or oscillate through an angle as the supported conveyor table reciprocates.

These types of reciprocating structures with pivoting support legs do not reciprocate along a true straight linear pathway, but instead move back and forth along an arc-shaped pathway determined by the length of the support legs. Depending on the length and angular range of the pivoting support legs, the conveyor surface, and the articles supported on the conveyor surface, move through an up and down vertical motion with each cycle as the reciprocating conveyor moves through a back and forth horizontal motion. Pivoting support legs also require space for the pivoting legs and may obstruct cleaning around and under the conveyor. Reciprocating conveyors can be used to move articles along a smooth conveyor surface by moving the conveyor surface from a starting position and in a first direction at a first rate of acceleration, and then by reversing and moving the conveyor surface back to the original starting position at a second rate of acceleration that is greater than the first rate of acceleration. This cycle of motion is called differential impulse motion, and a conveyor using this motion is called a differential impulse conveyor. The motion, called differential impulse movement, causes articles supported on the conveyor surface to remain in place on the conveyor and to move with the conveyor surface in the first direction, and then to slide on the conveyor surface as it is returned to the original starting position at a second and greater rate of acceleration. By repeating this cycle, an article can be moved steadily along the conveyor surface in the first direction. Reciprocating conveyors are especially useful in clean environments because the smooth conveyor surface can be of a material that can be easily cleaned and made free of contaminants and germs.

What is needed is a converter for converting rotary shaft motion to pure linearly reciprocating motion so that a source of rotary power, such as an electric motor, can be used to reliably drive a reciprocating conveyor. What is needed is a reciprocating conveyor that does not include angularly moving braces, legs, arms or struts for supporting the reciprocating conveyor.

BRIEF SUMMARY

One embodiment of the apparatus of the present invention comprises a pinion gear and a case with an interior ring gear, the pinion gear having a diameter that is one-half the diameter of the interior ring gear of the case. The pinion gear is connected to a pinion shaft that revolves around an axis of the interior ring gear as the pinion gear rotates about an axis of the pinion shaft. The interior ring gear of the case includes a plurality of teeth that are adapted for engagement with a plurality of teeth on the interior ring gear. The pinion gear is rotatably secured to a closure member. The center of the pinion gear is not aligned with the center of the closure member. The center of the pinion gear remains on a circular pathway and revolves about the center axis of the interior ring gear as the pinion gear rotates with the pinion shaft. As the pinion gear rotates and revolves, it remains engaged with the interior ring gear. In one embodiment of the present invention, the pinion gear has half the number of teeth and half the diameter as the interior ring gear so that the pinion gear rotates twice about the axis of the pinion shaft for each revolution of the pinion gear around an axis of the interior ring gear of the case. In one embodiment, the second plurality of teeth on the pinion gear is one-half the number of the first plurality of teeth on the interior ring gear.

For this geometric combination, a point on the periphery of the pinion gear moves along a fixed diameter line of the interior ring gear because the radius of the interior ring gear (half of the diameter line) is equal to the diameter of the pinion gear. In addition to the interior ring gear, the closure member that engages the case further includes exterior ring gear. The exterior ring gear on the closure member is engaged to be driven to rotate relative to the case by a motor. The exterior ring gear and closure member may be coupled to a motor shaft through a chain, a belt or by a drive gear. The case of the apparatus is secured in place relative to a frame that supports the conveyor so that the closure member can be driven to rotate about its center axis by the motor that drives the drive gear.

Another embodiment of the apparatus of the present invention comprises a closure member having a passage there through, a pinion shaft rotatably received through the passage of the closure member, a pinion gear having a first diameter connected to a proximal end of the pinion shaft, a crank arm having an inboard end connected to a distal end of the pinion shaft and an outboard end radially offset from an axis of the pinion shaft and having a force transfer member, a case having an opening and an interior ring gear with a second diameter that is twice the first diameter, the opening adapted to engage the closure member, wherein upon engagement of the closure member with the opening, the pinion gear engages the interior ring gear of the case, wherein powered rotation of the closure member revolves the pinion shaft about an axis of the interior ring gear and rotates the pinion gear about its axis to cause the force transfer member at the outboard end of the crank arm to reciprocate along a linear pathway, and wherein a reciprocating conveyor coupled to the force transfer member can be used to convey articles supported thereon. The closure member may engage a landing that surrounds the opening of the case wherein at least a portion of a load on the force transfer member is supported by the landing of the case through the closure member. The case may include a bottom disposed opposite the interior ring gear from the opening wherein the bottom of the case contains an amount of a lubricant that may be disposed within the case to lubricate the pinion gear and interior ring gear. The apparatus may include one or more bearings disposed intermediate the pinion shaft and the passage of the closure member to stabilize the pinion shaft as it rotates relative to the closure member. The apparatus may include a first mark on the interior ring gear, and a second mark on the pinion gear, a third mark on the closure member, and a fourth mark on the case, wherein the apparatus can be assembled by aligning the first mark with the second mark and the third mark with the fourth mark upon installing the closure member with the pinion shaft and the pinion gear onto the opening of the case with the interior ring gear.

An embodiment of a method of the present invention includes the steps of providing a closure member with a passage there through, a pinion shaft having a proximal end and a distal end, a pinion gear connected to the proximal end of the pinion shaft and having a first plurality of teeth, a crank arm having an inboard end connected to the distal end of the pinion shaft and an outboard end with a force transfer member, providing a case having an opening and an interior ring gear with a second plurality of teeth adapted to engage the first plurality of teeth on the pinion gear, disposing the closure member to engage the opening of the case to engage the first plurality of teeth on the pinion gear with the second plurality of teeth of the interior ring gear, supporting the case with the closure member engaged with the opening, engaging a reciprocatable conveyor with the force transfer member on the distal end of the pinion shaft, coupling a motor to drive the closure member to rotate and operating the motor to reciprocate the conveyor along a linear path as the pinion gear revolves and rotates within the interior ring gear. Optionally, an embodiment of a method of the present invention includes the additional step of providing a floor opposite the interior ring gear from the opening of the case to contain a lubricant within the second body to lubricate the pinion gear and the interior ring gear. An embodiment of the method of the present invention may include the steps of disposing a first mark on the interior ring gear, disposing a second mark on the pinion gear and aligning the first mark with the second mark upon installing the closure member to which the pinion gear is rotatably coupled to engage the case. An embodiment of the method of the present invention may include the step of providing a seal between the closure member of the case and the closure member. In one embodiment of the apparatus, the second plurality of teeth of the pinion gear is one-half the number of the first plurality of teeth of the interior ring gear.

Another embodiment of the apparatus of the present invention comprises a conveyor movably supported on a frame, a converter for converting rotary input to reciprocating linear output, the converter including a case with an interior cavity having an interior ring gear with a first plurality of teeth and a first diameter, the interior ring gear being adjacent to an opening in the case, a closure member having a passage therethrough, the closure member adapted for engaging the opening of the case, a pinion gear having a second diameter that is half the first diameter and a second plurality of teeth adapted to engage the first plurality of teeth, a pinion shaft received through the passage and having a proximal end connected to the pinion gear engaged with the interior ring gear and a distal end coupled to an inboard end of a crank arm disposed opposite the closure member from the pinion gear, an outboard end of the crank arm connected to a force transfer member that is coupled to the conveyor, the apparatus further including a rotary motor wherein coupling the rotary motor to the closure member and operating the motor to rotate the closure member relative to the case linearly reciprocates the conveyor relative to the frame. In one embodiment of the apparatus, the second plurality of teeth of the pinion gear is one-half the number of the first plurality of teeth of the interior ring gear.

Embodiments of the apparatus of the present invention employ a mathematical and geometric phenomenon called the Tusi Couple, which is named for the $13^{th}$ century Persian astronomer Nasir al-Din al-Tusi. Tusi found that a smaller circle rotating and revolving within a larger circle of twice the diameter will, at any selected point at the periphery of the smaller circle, trace and then retrace a diameter across the larger circle, also known as oscillatory motion. Using gears with teeth along their periphery enables us to prevent slippage and to maintain positive contact between the two circles and to thereby produce the desired reciprocating motion.

Reciprocating conveyors may use devices that convert constant rotational speed motor output to a cyclically variable movement. One example of a device that can be used to convert constant rotational speed motor output to a cyclically variable movement is an eccentrically mounted sheave or pulley coupled intermediate the output shaft of the motor and the driven device. Counterweights can be used to offset the rotary imbalance caused by the eccentrically mounted sheave or pulley. Another example of a device that can be used to convert constant speed rotational output to cyclically variable speed rotation output include an angled universal joint with a 2:1 speed enhancer disposed intermediate the motor and the driven device as is disclosed in U.S. Pat. Nos. 6,398,013 and 6,079,548 to Svejkovsky et al. It will be understood that the speed and the angle of the universal joint can be adjusted to obtain a cyclical linear reciprocating output with a desired acceleration profile.

Alternately, electronically controlled variable speed electric motors can provide cyclically variable rotational output. Either a constant speed rotational output motor with a device to convert the constant rotational speed to a cyclically variable rotational output or an electronically controlled electric motor with variable speed output can be used, with the converter, to reciprocate a conveyor. A cyclically variable speed motor, or a constant speed motor with a device for converting the constant rotary output speed to a cyclically variable rotary output (such as a universal joint with speed enhancer or an eccentric sheave or pulley), must be properly timed with an embodiment of the rotary to linear reciprocating motion converter of the present invention to produce repeating, cyclical linear reciprocating movement of a conveyor. For this reason, the entire drive train from the motor to the conveyor is preferably a positive drive or non-slip system, and drive components such as, but not limited to, gears that engage through mating teeth, gears that engage through a chain comprised of links that are of equal length, sheaves or pulleys engaged through notched or synchronous belts, or through step sheaves or step pulleys to drive or that are driven by indexed belts having notches engaged by the steps of the sheaves or pulleys. Conventional belts and pulleys such as, for example, V-belts, can also be used with embodiments of the present invention if precautions are taken to ensure against slippage. It will be understood that there are a variety of ways in which a cyclically variable rotary speed output can be provided from a motor to rotate the closure member of an embodiment of the apparatus of the present invention including, but not, limited to, conditioning the electrical current provided to the motor, driving an eccentric pulley member using a constant speed rotary motor, and driving an angled universal joint with a speed enhancer using a constant speed rotary motor, and that there are other linkages, mechanisms and devices that can be used to provide the desired cyclically variable rotary power source.

BRIEF DESCRIPTION OF THE SEVERAL VIEWS OF THE DRAWINGS

FIG. 3 is a partially sectioned view of the closure member assembly of FIG. 1.

FIG. 4 is a sectioned view of the case of FIG. 2 illustrating the position of a landing and a rim near a top of the case and an interior ring gear within the interior cavity of the case.

DETAILED DESCRIPTION

Figure 1:
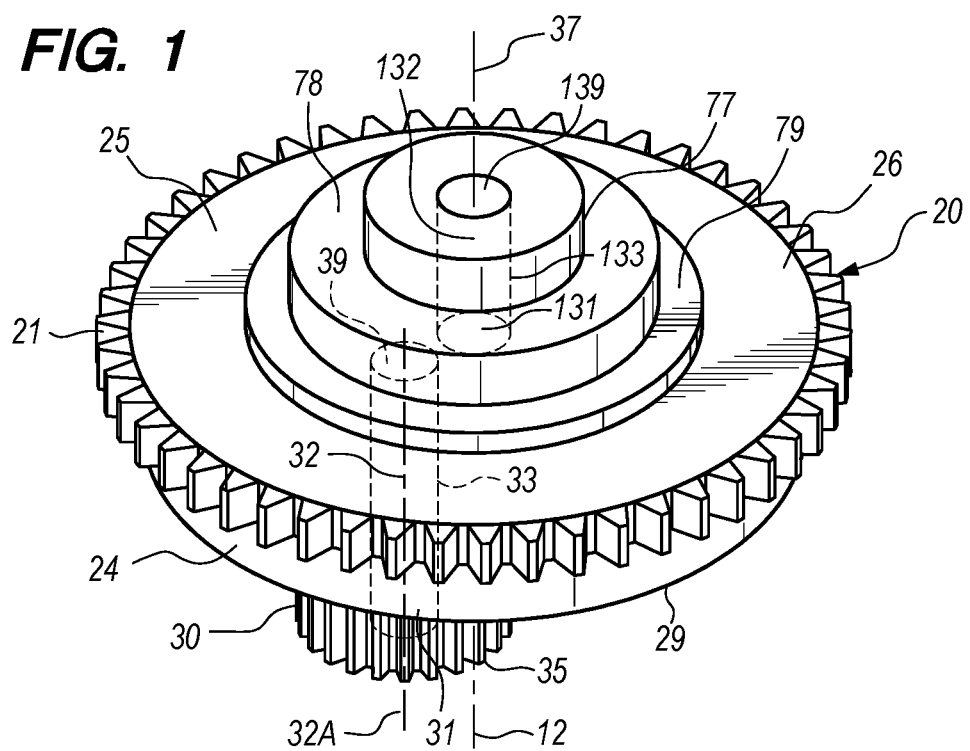
FIG. 1 is a perspective view of a closure member assembly of an embodiment of the apparatus of the present invention.

FIG. 1 is a perspective view of a closure member assembly 20 of an embodiment of the apparatus 100 of the present invention. The closure member assembly 20 includes a closure member 26 with a passage there through, a pinion gear 30 coupled below the closure member 26 to a proximal end 31 of a pinion shaft 33 (shown in dotted lines) rotatably received within the passage, the pinion gear 33 having an axis of rotation 32. The pinion gear 30 has an axis 32A that coincides with the axis 32 of the pinion shaft 33. The closure member 26 includes a plurality of equiangularly-spaced peripheral teeth 21 for being engaged by a mechanical driver such as, for example, a chain, a belt or a drive gear that is coupled to a motor (not shown in FIG. 1). The pinion shaft 33 includes a distal end 39 connected above the closure member 26 to a crank arm 79 which, in the embodiment of the closure member assembly 20 of FIG. 1, is formed of a generally circular plate.

Figure 2:
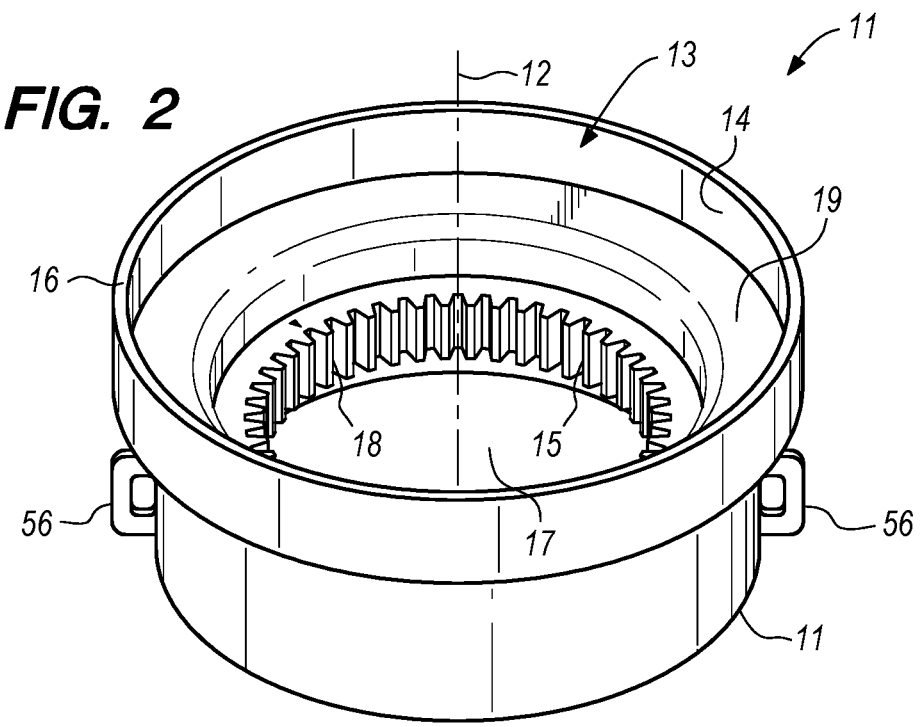
FIG. 2 is a perspective view of a case of the embodiment of the apparatus of the present invention that cooperates with the closure member assembly of FIG. 1.

In one embodiment of the present invention, the closure member 26 of the closure member assembly 20 is shaped to engage and close an opening 13 to an interior cavity 17 of a case 11 (see opening 13 of case 11 shown in FIG. 2). The closure member assembly 20 shown in FIG. 1 includes a proximal bearing 24 that reduces the friction of rotation of the closure member 26 relative to the case 11. The closure member 26 includes a second side 25. The closure member assembly 20 of FIG. 1 further includes a force transfer member 133 connected to the crank arm 79. The force transfer member 133 is connected at a proximal end 131 to the crank arm 79 at a position that is offset from an axis 32 of the pinion shaft 33. A distal end 139 of the force transfer member 133 is rotatably coupled to a load plate 77. The force transfer member 133 extends generally parallel to the axis 32 of the pinion shaft 33. The pinion gear 30, the pinion shaft 32, the crank arm 79 and the force transfer member 133 together form a crank assembly, as will be discussed below in more detail in relation to FIG. 13. The force transfer member 133 may be coupled at the distal end 132 to the load plate 77 and it may engage a proximal load plate 78 intermediate the proximal end 131 and the distal end 139 to provide a larger load bearing surface and additional sliding engagement between the load plate 77 and the proximal load plate 78.

FIG. 2 is a superior perspective view of a case 11 of the embodiment of the apparatus of the present invention that engages the closure member assembly 20 illustrated in FIG. 1. The case 11 of FIG. 2 is shown in an aligned position with the closure member assembly 20 of FIG. 1 with the proximal bearing 24 of the closure member assembly 20 of FIG. 1 in alignment with an opening 13 to an interior cavity 17 of the case 11 of FIG. 2. The proximal bearing 24 surrounds and conceals the protruding portion 27 (not shown) of the closure member assembly 20, and is discussed below in connection with FIGS. 14 and 15. The interior cavity 17 of the case 11 in FIG. 2 includes an interior ring gear 18 with a second plurality of teeth 15 adapted for engaging the first plurality of teeth 35 of the pinion gear 30 of the closure member assembly 20 shown in FIG. 1. The second side 25 of the closure member 26 of the closure member assembly 20 of FIG. 1 engages a top 16 of a rim 14 of the case 11 of FIG. 2. The proximal bearing 24 of the closure member assembly 20 of FIG. 1 is sized for engaging the landing 19 surrounding the interior cavity 17 of the case 11 of FIG. 2.

FIG. 3 is a partially sectioned elevation view of the closure member assembly 20 of FIG. 1. FIG. 3 better illustrates the axis 37 of the force transfer member 133 being offset from and parallel to the axis 32 of the pinion shaft 33 and the axis 32A of the pinion gear 30 coincident therewith. The combination of the force transfer member 133, the crank arm 79, the pinion shaft 33 and the pinion gear 30 form a crank member (see FIG. 13) because the movement of the force transfer member 133 is determined by both the rotation and position of the pinion gear 30 and the offset between the axis 37 of the force transfer member 133 and the axis 32 of the pinion shaft 33, both of which are connected to the crank arm 79. FIG. 3 further reveals the position of bearings 38 provided in the closure member assembly 20 to rotatably secure and stabilize the pinion shaft 33 relative to the closure member 26. The pinion shaft 33 is rotatably received through a passage 34 in the closure member 26. Bearings 38 may be provided to minimize friction resulting from rotation of the pinion shaft 33.

FIG. 4 is a sectioned view of the case 11 of FIG. 2 illustrating the position of the landing 19 and the rim 14 near a top 16 of the case 11 and the interior ring gear 10 within the interior cavity 17 of the case 11. The teeth 15 of the interior ring gear 10 are adapted for engagement with the teeth 35 on the pinion gear 30 shown in FIG. 3. FIG. 4 illustrates the sizing of the rim 14 to receive the proximal bearing 24 and to engage the closure member 26 of the closure member assembly 20 of FIG. 3. The rim 14 of the case 11 of FIG. 4 is sized to receive and surround the proximal bearing 24 of the closure member assembly 20, and the landing 19 of the case 11 is at a depth relative to the top 16 of the case 11 to engage and support the proximal bearing 24 of the closure member assembly 20.

Figure 5:
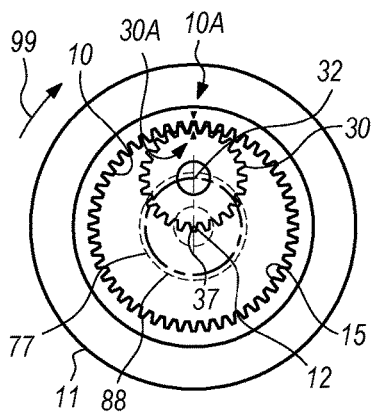
FIG. 5 is a diagram illustrating the position of the pinion gear of the closure member assembly of FIGS. 1 and 3 disposed in engagement with the interior ring gear of the case of FIGS. 2 and 4, the teeth of the pinion gear of the closure member assembly engaging the teeth of the interior ring gear of the case.

FIG. 5 is a diagram illustrating the position of the pinion gear 30 of the closure member assembly 20 of FIGS. 1 and 3 disposed in engagement with the interior ring gear 10 of the case 11 of FIGS. 2 and 4, the teeth 35 of the pinion gear 30 of the closure member assembly 20 engaging the teeth 15 of the interior ring gear 10 of the case 11. FIG. 5 illustrates the position of a point 37A on the pinion gear 30 that is disposed in alignment with the axis 37 of a force transfer member 133 (not shown in FIG. 5—but aligned with the center of the distal load plate 77) that is connected through the crank arm 79 and the pinion shaft 33 to the pinion gear 30. The force transfer member 133 is discussed further below. The axis 32 of the pinion shaft 33 and the pinion gear 30 will revolve in a circular path 88 around the center axis 12 (not shown in FIG. 5—see FIG. 4) of the case 11 and in the direction of the arrow 99 in FIG. 5. The pinion gear 30 will rotate about the axis 32 as the axis 32 follows the circular path 88. The uniformly dashed circle (indicated by the reference numeral 77) indicates the position of the distal load plate 77 corresponding to the position of the point 37A on the pinion gear 30 within the interior ring gear 10. The distal load plate 77, which will be centered around the force transfer member 133 (not shown in FIG. 5—see FIG. 3) which is, in turn, always in alignment with the same point 37A at the periphery of the pinion gear 30.

Figure 6:
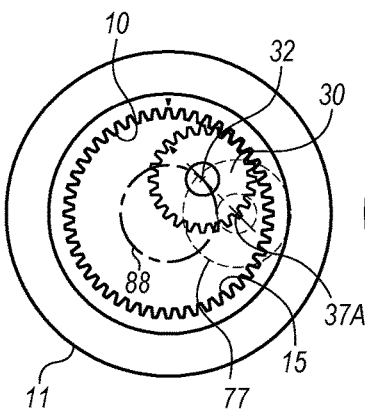
FIG. 6 is the diagram of FIG. 5 after the pinion gear of the closure member assembly rotates about its axis while the axis of the pinion gear simultaneously revolves, in a clockwise direction, along a circular path around an axis of the interior ring gear of the case.

FIG. 6 is the diagram of FIG. 5 after the pinion gear 30 rotates further about its axis 32 while the axis 32 of the pinion shaft 33 and the pinion gear 30 simultaneously revolves, in a clockwise direction, along a circular path 88 around an axis 12 of the interior ring gear 10 and the case 11. The uniformly dashed circle (indicated by the reference numeral 77) indicates the position of the distal load plate 77 corresponding to the position of the point 37A on the pinion gear 30 within the interior ring gear 10.

Figure 7:
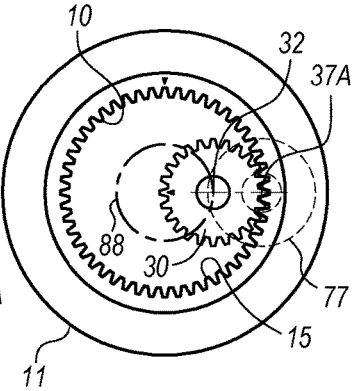
FIG. 7 is the diagram of FIG. 6 after the pinion gear of the closure member assembly rotates further about its axis while the axis of the pinion gear continues to revolve, in a clockwise direction, along a circular path around an axis of the interior ring gear of the case.

FIG. 7 is the diagram of FIG. 6 after the pinion gear 30 rotates further about its axis 32 while the axis 32 of the pinion shaft 33 and the pinion gear 30 continues to revolve, in a clockwise direction, along a circular path 88 around an axis 12 of the interior ring gear 10. The uniformly dashed circle (indicated by the reference numeral 77) indicates the position of the distal load plate 77 corresponding to the position of the point 37A on the pinion gear 30 within the interior ring gear 10.

Figure 8:
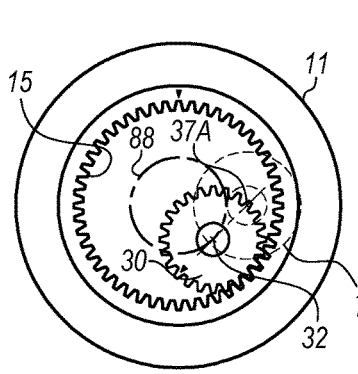
FIG. 8 is the diagram of FIG. 7 after the pinion gear of the closure member assembly rotates further about its axis while the axis of the pinion gear simultaneously revolves, in a clockwise direction, along a circular path around an axis of the interior ring gear of case.

FIG. 8 is the diagram of FIG. 7 after the pinion gear 30 rotates further about its axis 32 while the axis 32 of the pinion gear 30 continues to revolve, in a clockwise direction, along a circular path 88 around an axis 12 of the interior ring gear 10. The uniformly dashed circle (indicated by the reference numeral 77) indicates the position of the distal load plate 77 corresponding to the position of the point 37A on the pinion gear 30 within the interior ring gear 10.

Figure 9:
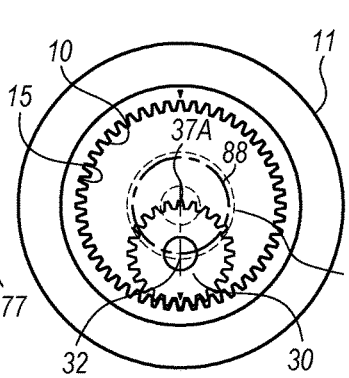
FIG. 9 is the diagram of FIG. 8 after the pinion gear of the closure member assembly rotates further about its axis while the axis of the pinion gear simultaneously revolves, in a clockwise direction, along a circular path around an axis of the interior ring gear.

FIG. 9 is the diagram of FIG. 8 after the pinion gear 30 rotates further about its axis 32 while the axis 32 of the pinion gear 30 continues to revolve, in a clockwise direction, along a circular path 88 around an axis 12 of the interior ring gear 10. The uniformly dashed circle (indicated by the reference numeral 77) indicates the position of the distal load plate 77 corresponding to the position of the point 37A on the pinion gear 30 within the interior ring gear 10.

Figure 10:
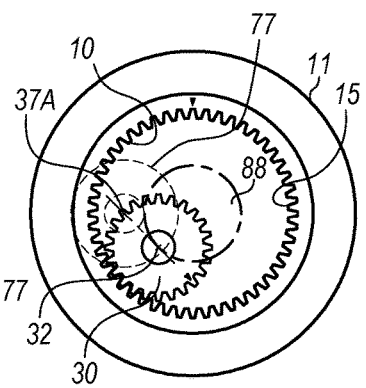
FIG. 10 is the diagram of FIG. 9 after the pinion gear of the closure member assembly rotates further about its axis while the axis of the pinion gear simultaneously revolves, in a clockwise direction, along a circular path around an axis of the interior ring gear of the case.

FIG. 10 is the diagram of FIG. 9 after the pinion gear 30 rotates further about its axis 32 while the axis 32 of the pinion gear 30 continues to revolve, in a clockwise direction, along a circular path 88 around an axis 12 of the interior ring gear 10. The uniformly dashed circle (indicated by the reference numeral 77) indicates the position of the distal load plate 77 corresponding to the position of the point 37A on the pinion gear 30 within the interior ring gear 10.

Figure 11:
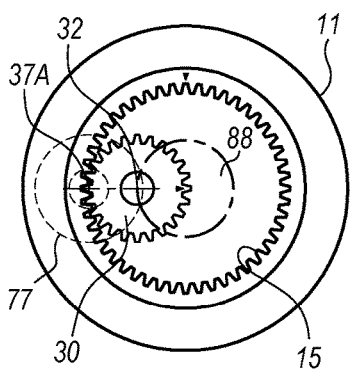
FIG. 11 is the diagram of FIG. 10 after the pinion gear of the closure member assembly rotates further about its axis while the axis of the pinion gear simultaneously revolves, in a clockwise direction, along a circular path around an axis of the interior ring gear of the case.

FIG. 11 is the diagram of FIG. 10 after the pinion gear 30 rotates further about its axis 32 while the axis 32 of the pinion gear 30 continues to revolve, in a clockwise direction, along a circular path 88 around an axis 12 of the interior ring gear 10. The uniformly dashed circle (indicated by the reference numeral 77) indicates the position of the distal load plate 77 corresponding to the position of the point 37A on the pinion gear 30 within the interior ring gear 10.

Figure 12:
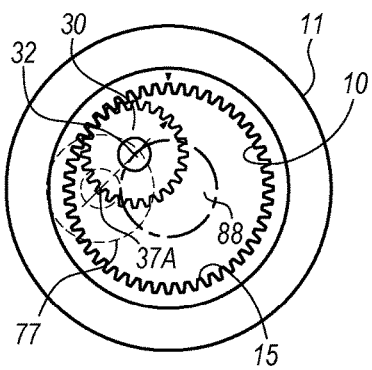
FIG. 12 is the diagram of FIG. 11 after the pinion gear of the closure member assembly rotates further about its axis while the axis of the pinion gear simultaneously revolves, in a clockwise direction, along a circular path around an axis of the interior ring gear of the case.

FIG. 12 is the diagram of FIG. 11 after the pinion gear 30 rotates further about its axis 32 while the axis 32 of the pinion gear 30 continues to revolve, in a clockwise direction, along a circular path 88 around an axis 12 of the interior ring gear 10. The uniformly dashed circle (indicated by the reference numeral 77) indicates the position of the distal load plate 77 corresponding to the position of the point 37A on the pinion gear 30 within the interior ring gear 10.

It will be understood that the progression of the pinion gear 30 about the interior ring gear 10 illustrated in FIGS. 5-12 indicating the internal movement of components of an embodiment of an apparatus of the present invention when the closure member 26 is driven to rotate relative to the case 11, can be reversed by driving the closure member 26 to rotate in the opposite direction. It will be further understood that the direction of movement of articles supported on a conveyor 70 to be driven using an embodiment of the rotary to reciprocating linear motion converter of the present invention depends on the cycle pattern for modulating the output of the driver. For example, but not by way of limitation, a current conditioner 43 may be used and programmed to condition electrical current provided to operate a drive motor 28 that is engaged to rotate the closure member 26 relative to the case 11 of the converter 100. The variable output motor 28 and the current conditioner 43 used to drive the motor 28 must be adjusted and timed one with the other to produce the desired direction of movement of articles on the conveyor 70 and differential impulse movement of the conveyor 70 to move the articles.

Figure 13:
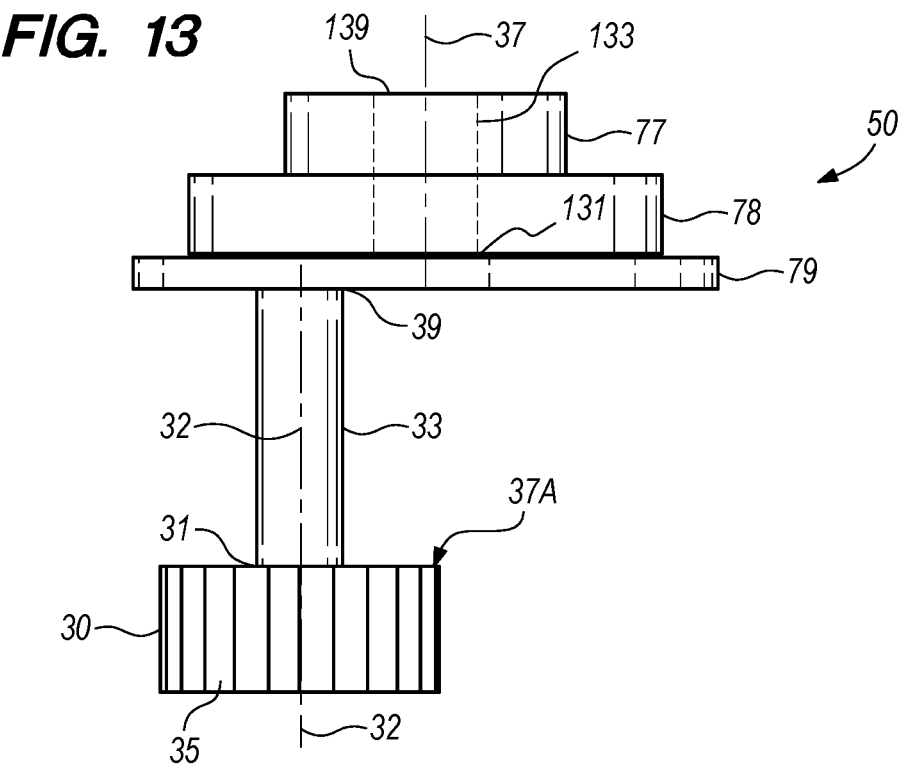
FIG. 13 is an elevation view of the closure member assembly with a pinion gear rotatably disposed on a proximal end of a pinion shaft having a distal end connected to an inboard end of a crank arm.

FIG. 13 is an elevation view of the crank assembly 50 of an embodiment of an apparatus 100 of the present invention, the crank assembly 50 including a pinion gear 30 rotatably disposed on a proximal end 31 of a pinion shaft 33 having a distal end 39 connected to a crank arm 79. The axis 37 of the distal load plate 77, which surrounds the force transfer member 133 is fixed in alignment with the point 37A on the periphery of the pinion gear 30. The crank arm 79 is connected to the distal end 39 of the pinion shaft 33 and also to the proximal end 131 of the load support 133 that is surrounded at its distal end 139 by the distal load plate 77 and surrounded intermediate the proximal end 131 and the distal end 139 by the proximal load plate 78. The crank arm 79 may be shaped to provide a large sliding engagement contact area between the crank arm 79 and the closure member 26 (not shown in FIG. 13—see FIG. 3) and also to provide a large sliding engagement contact area between the crank arm 79 and the proximal load plate 78.

Figure 13A:
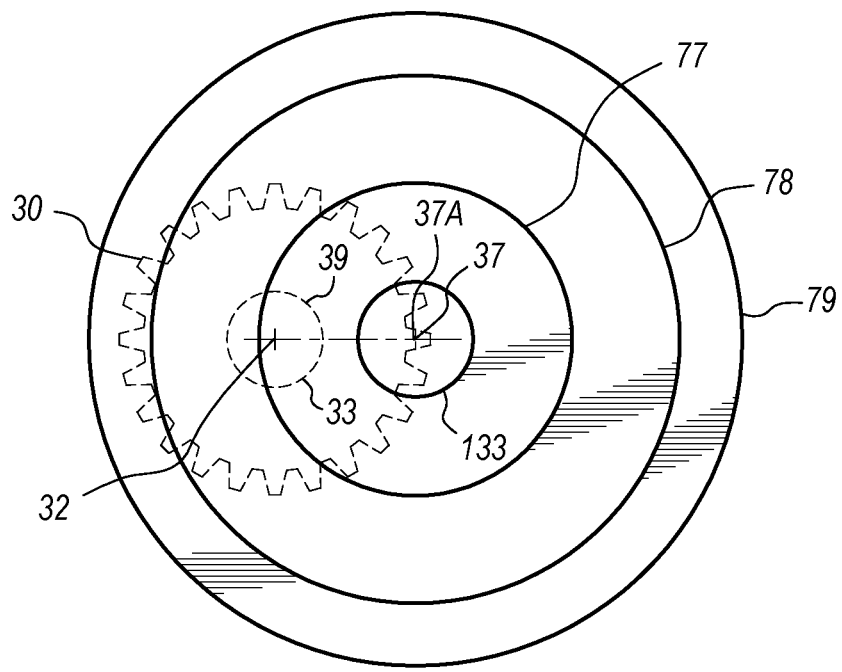
FIG. 13A is a plan view of the case with the pinion gear superimposed in dotted lines within the case.

FIG. 13A is a diagram illustrating the position of the pinion gear 30 (shown in dotted lines), the distal end 39 of the pinion shaft 33, the axis 32 of the pinion shaft 33, and the force transfer member 133 and the axis 37 of the force transfer member 133. The positions of these components of the apparatus 100 in FIG. 13A corresponds to the position shown in FIG. 11.

Figure 14:
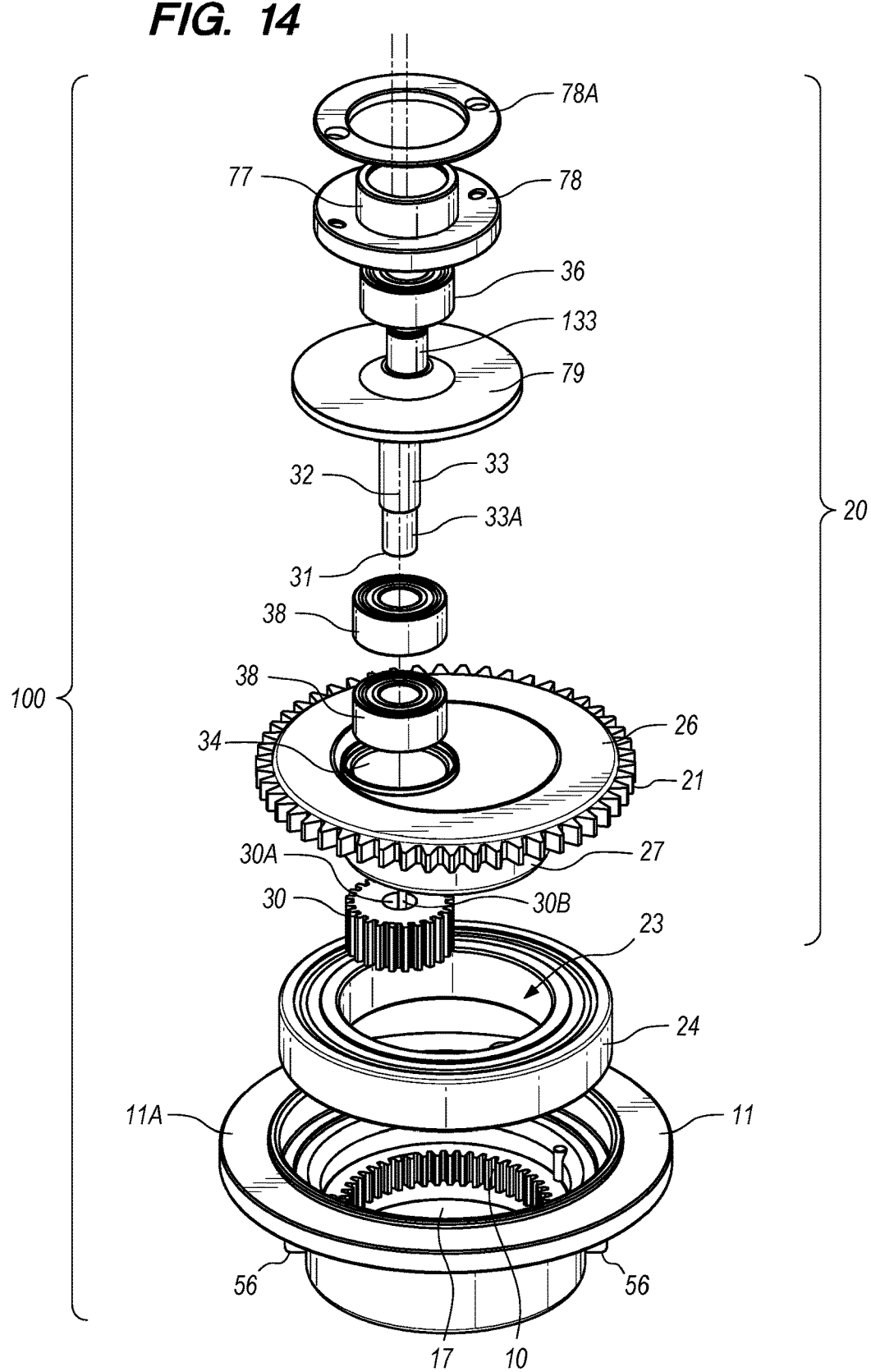
FIG. 14 is a superior exploded view of an embodiment of the apparatus of the present invention.

FIG. 14 is a superior exploded perspective view of an embodiment of the apparatus 100 of the present invention. The embodiment of the apparatus 100 in FIG. 14 includes a closure member assembly 20 that includes a closure member 26 having a passage 34 through which the pinion shaft 33 will extend upon assembly. The closure member 26 includes a plurality of teeth 21 disposed thereon for engaging a driver (not shown in FIG. 14) such as, for example, a motor. The pinion shaft 33 is aligned with a pair of rotary bearings 38 that stabilize the pinion shaft 33 and reduce frictional engagement between the pinion shaft 33 and the closure member 26. FIG. 14 illustrates the crank arm 79 connected to a distal end 39 (not shown in FIG. 14) of the pinion shaft 33. The force transfer member 133 extends upwardly from the crank arm 79. While the crank arm 79 of the embodiment of the apparatus 100 of FIG. 14 is circular in shape, it will be understood that the shape of the crank arm 79 can be manipulated to provide other benefits such as, for example, sliding engagement contact area between the crank arm 79 and other structures such as the closure member 26. The force transfer member 133 is generally parallel with, but offset from (i.e., not in alignment with), the axis 32 of the pinion shaft 33 there below, and is connected to the crank arm 79. The force transfer member 133 may be fitted with a rotary bearing 36 to reduce friction, and with a distal load plate 77 with a flange 78 and a ring cap 78A to provide a larger load bearing area for the force transfer member 79.

The pinion gear 30 illustrated in FIG. 14 includes a bore 30A having a keyway 30B for receiving a key (not shown) and securing the pinion gear 30 to rotate with the pinion shaft 33. The pinion shaft 33 includes a reduced diameter portion 33A that is received and rotatably secured, using the key (not shown), within the bore 30A of the pinion gear 30.

FIG. 14 further illustrates the proximal bearing 24 of the closure member 26. The proximal bearing 24 is sized to receive and surround a protruding portion 27 on the closure member 26 within a bore 23 of the proximal bearing 24 upon assembly of the apparatus 100. The pinion gear 30 will engage the interior ring gear 10 of the case 11 below the proximal bearing 24 upon assembly of the apparatus 100.

Figure 16:
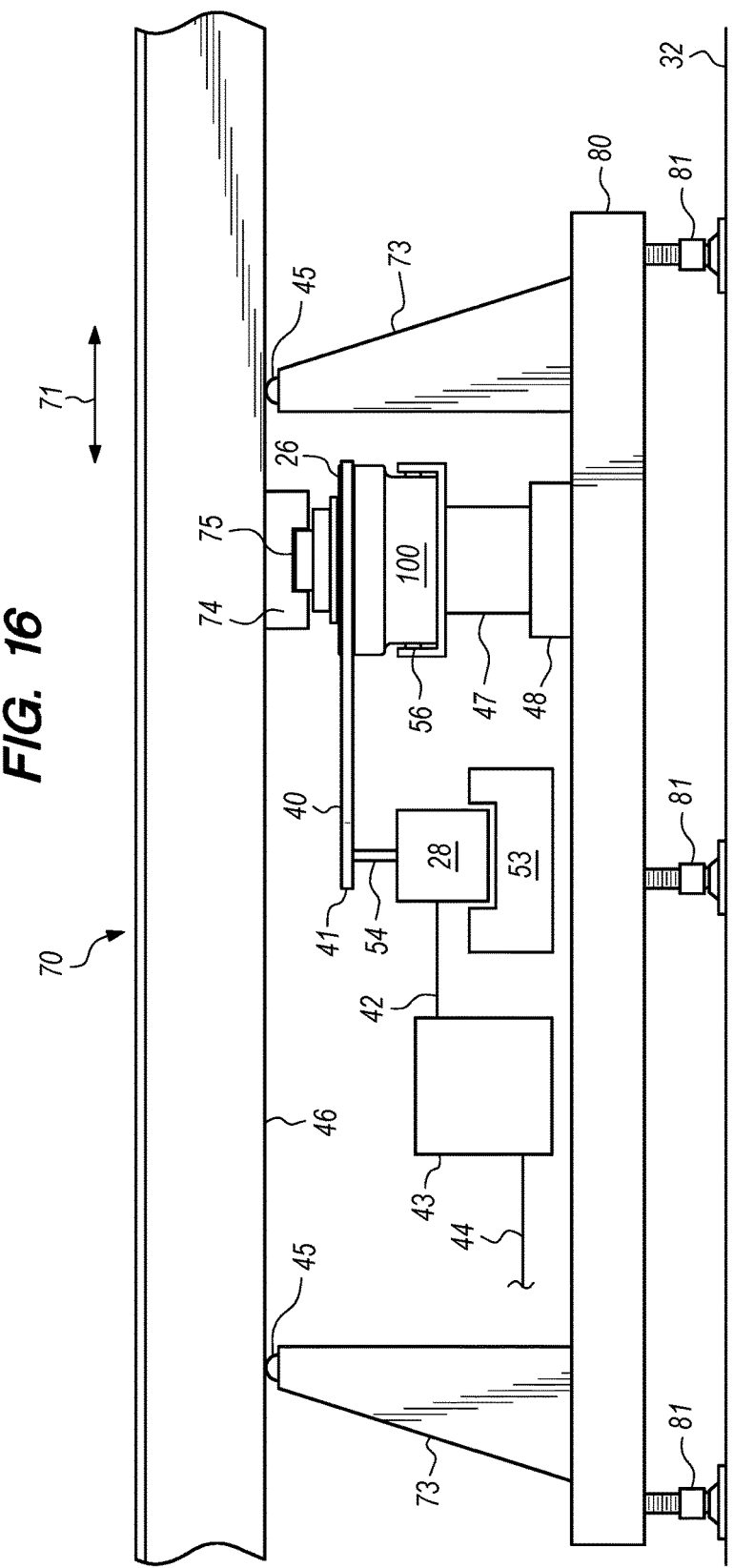
FIG. 16 is an elevation view of a section of a reciprocating conveyor that reciprocates as indicated by the double-headed arrow while being supported on and moved to reciprocate by an embodiment of the apparatus powered by a variable speed rotary output motor.

FIG. 14 further illustrates a flange 11A around the case 11 and ears 56 on the case 11 for use in securing the case 11 of the assembled apparatus 100 to a supporting structure (not shown—see FIG. 16) to enable the closure member 26 of the apparatus 100 to be driven to rotate, relative to the case 11, by a motor 28 (not shown in FIG. 14—see FIG. 16) and to enable the apparatus 100 to be used as a rotary motion converter for reciprocating and supporting a reciprocating conveyor 70 (not shown in FIG. 14—see FIG. 16). FIG. 14 illustrates the interior cavity 17 into which a lubricant (not shown) can be deposited to lubricate the apparatus 100.

Figure 15:
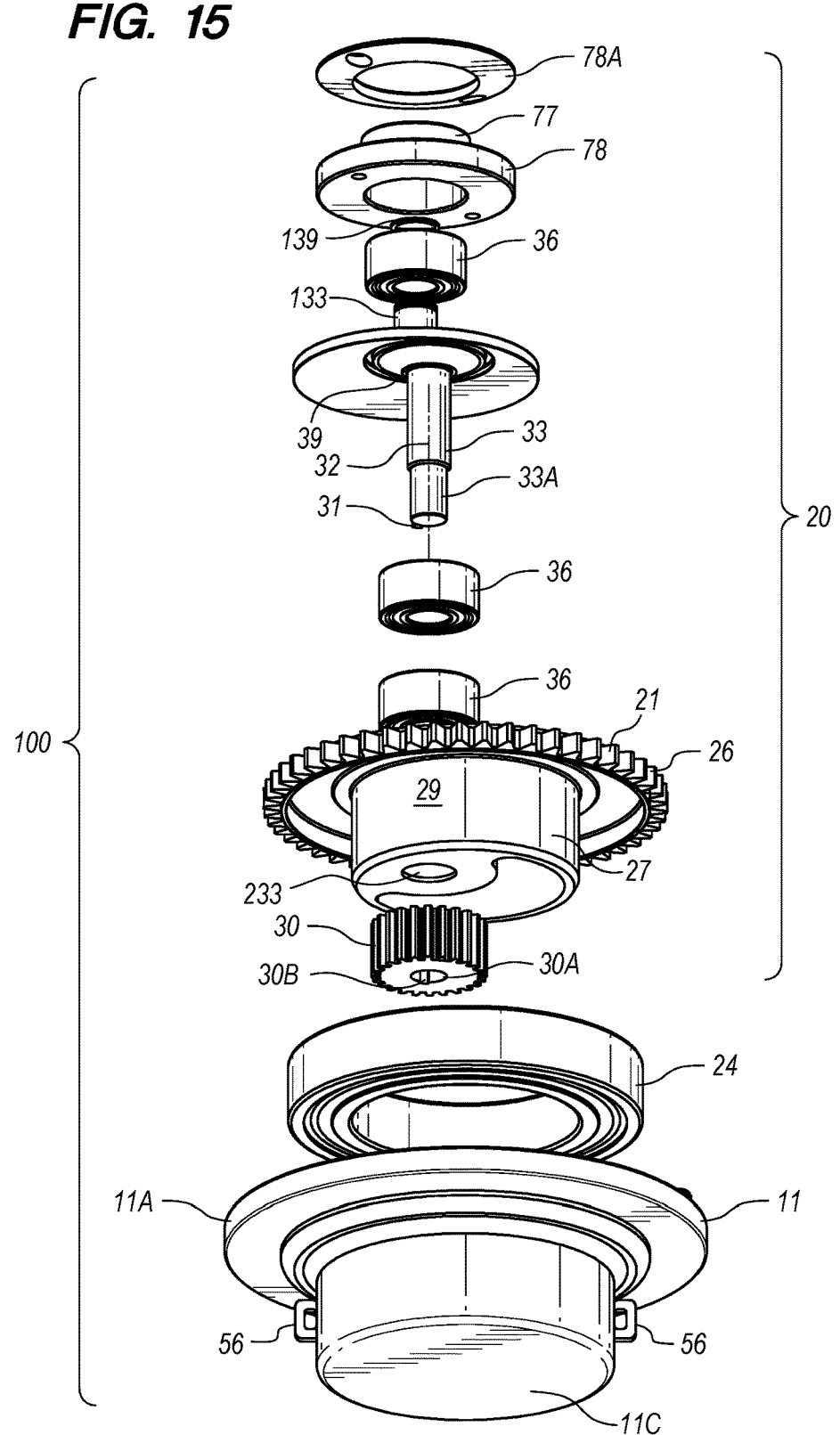
FIG. 15 is an inferior exploded view of the apparatus of FIG. 14.

FIG. 15 is an inferior exploded perspective view of the apparatus 100 of FIG. 14. FIG. 15 reveals the distal end 39 of the pinion shaft 33 connected to the crank arm 79 at a position that is radially offset from (i.e. not aligned with) the adjacent force transfer member 133 extending from the crank arm 79. FIG. 15 also reveals the protruding portion 27 on the closure member 26 that is sized for being received into the bore 23 of the proximal bearing 24 of the closure member 26. The protruding portion 27 of the closure member 26 includes an exterior wall 29 that engages the proximal bearing 24 to rotatably secure the closure member 26 and the protruding portion 27 in position within the case 11 of the apparatus 100. The protruding portion 27 further includes a passage 233 for rotatably receiving the pinion shaft 33. It will be understood that the combination of the exterior wall 29 of the protruding portion 27 of the closure member 26, the proximal bearing 24 having a bore 23 to receive and engage the protruding portion 27, and the aperture 233 through the protruding portion 27 to rotatably receive the pinion shaft 33 work together to restrain the movement of the pinion shaft 33 to rotation within the passage 233, as permitted by the engagement of the pinion gear 30 with the interior ring gear 10 of the case 11, and also to maintain the axis 32A (not shown in FIG. 15) of the rotating pinion gear 30 and the axis 32 of the pinion shaft 33 remain on a path defined by the circle 88 shown in FIGS. 5-12. It will be further understood that the offset between the axis 32 of the pinion shaft 33 and the force transfer member 133 is of an amount that causes the force transfer member 133 to be aligned with, and to remain in alignment with, a point 37A at the periphery of the pinion gear 30 (see FIGS. 5-12). In this manner, the force transfer member 133 will move in alignment with the aligned point 37A on the periphery of the pinion gear 30 as it supports a reciprocating structure such as, for example, a differential impulse conveyor.

FIG. 15 illustrates how the case 11 may include a bottom 11C so that lubrication disposed within the case 11 to lubricate the pinion gear 30, the interior ring gear 10, and the pinion shaft 33 will remain isolated within the assembled apparatus 100 and free from external debris.

FIG. 16 is an elevation view of a section of a reciprocating (differential impulse) conveyor 70 reciprocating as indicated by the double-headed arrow 71 while being moved by and supported by an embodiment of the apparatus 100 of the present invention. The apparatus 100, when applied in the manner shown in FIG. 16, functions as a rotary to linear motion converter that converts rotary output power from a motor 28 to linear reciprocating motion of the conveyor 70 supported thereon. The conveyor 70 of the apparatus 100 in FIG. 16 is movably supported on a pair of support members 73, each support member 73 having a rolling support 45 to engage the bottom surface 46 of the conveyor 70. The conveyor 70 includes a conveyor bracket 74 having a recess 75 therein to receive the force transfer member 133 (not shown in FIG. 16) and/or the distal load plate 77 (not shown in FIG. 16) of the apparatus 100. The pair of frames 73 are supported on a base 80 that includes a plurality of adjustable support feet 81 for supporting the support member 73 on a floor 32. It will be understood that the stroke of reciprocation of the conveyor 70, which is the distance of movement of the conveyor 70 in each direction for each cycle of reciprocation, will be equal to the stroke of the force transfer member 133 of the apparatus 100 which is the distance that the distal load plate 77 (not shown in FIGS. 5-12 but always aligned with the point 30A on the pinion gear 30 in FIGS. 5-12) moves from the position shown in FIG. 5 to the position shown in FIG. 9. It will be understood that the same stroke distance applies to the return stroke illustrated by FIG. 9 to FIG. 12.

The embodiment of the apparatus 100 of the present invention shown in FIG. 16 is supported on a pedestal 47 and a pedestal base 48 at a proper height to engage the apparatus 100 with the recess 75 of the conveyor bracket 74. The ears 56 of the case 11 of the apparatus 100 engage the pedestal 47 to ensure that the case 11 is held stationary during operation of the conveyor 70. The teeth 21 of the closure member 26 are engaged by a chain 40 that is driven by a drive gear 41 coupled to the motor 28. A current supply conduit 44 provides electrical current to a current conditioner 43 that conditions the current to vary the rotary speed of the drive gear 41 that is coupled to the motor 28. The combination of the current conditioner 43 and the motor 28 ensures that the apparatus 100 and the conveyor 70 reciprocated thereby move in slow forward—fast return motion that moves articles along the conveyor 70. The motor 28 is supported in position by a motor support 53 that secures the motor 28 against rotation as it drives the closure member 26 of the apparatus 100 to rotate relative to the case 11 of the apparatus 100.

Figure 17:
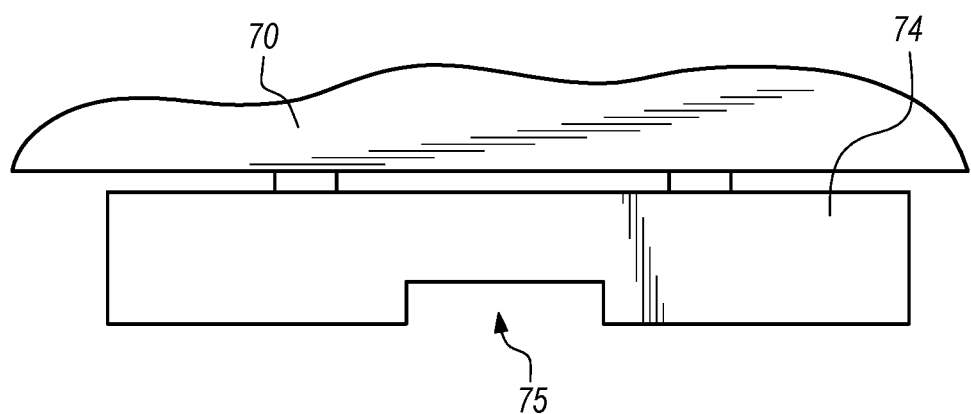
FIG. 17 is an enlarged view of the bracket of FIG. 16 illustrating the recess as being shaped and sized to engage the distal end of the force transfer member and/or the distal load plate of the apparatus.

FIG. 17 is an enlarged view of the conveyor bracket 74 of the conveyor 70 of FIG. 16 illustrating the recess 75 as being shaped and sized to engage the distal end 139 of the force transfer member 133 and/or the distal load plate 77 of the apparatus 100 (not shown in FIG. 17—see FIG. 13).

Returning to FIG. 5, the orientation of the pinion gear 30 and the force transfer member 133 connected thereto of the closure member assembly 20 relative to the interior ring gear 10 of the case 11 will determine the orientation of the line on which linear reciprocation of the force transfer member 133 will occur. The orientation of the pinion gear 30, the force transfer member 133, and the case 11 must be timed or synchronized with the cyclical output of the current conditioner 43 so that the desired variable current output is timed or synchronized with the operation of the apparatus 100 to produce the desired differential impulse action of the reciprocating conveyor 70. The apparatus 100 of the present invention can be indexed upon assembly to enable the closure member assembly 20 and the case 11 to be oriented to provide linear reciprocation of the force transfer member 133 along a desired linear pathway, and that linear pathway must be aligned with the conveyor 70 (see FIG. 16). For example, but not by way of limitation, the interior ring gear 10 may include a ring gear mark 10A as shown in FIG. 5. Similarly, the pinion gear 30 may include a pinion gear mark 30A as shown in FIG. 5 immediately radially inwardly towards the axis 12 of the interior ring gear 10 of the case 11. The alignment of the ring gear mark 10A and the pinion gear mark 30A as shown in FIG. 5 would, in the example shown in FIGS. 5-12, result in the force transfer member 133 (not shown in FIG. 5) reciprocating across the interior ring gear 10 as illustrated in FIGS. 5-12. It will be understood that the orientation of the case 11 and the pinion gear within the interior ring gear 10 of the case 11 is needed to provide for proper movement of the force transfer member 133 with the reciprocation of the structure supported on the apparatus 100, such as the conveyor 70 of FIG. 16.

It will be understood that embodiments of the present invention are limited only by the claims that are appended hereto below. The embodiments illustrated in the appended drawings include a distal load plate 77 that may be received into a recess 75 in a conveyor bracket 74. However, the force transfer member 133 on the arm member 79 in FIG. 13 can be coupled to the reciprocating structure 70 (conveyor) that is supported by the force transfer member 133 in other ways without departing from the use of the invention.

"Force transfer member," as that term is used herein, means a member for transferring force from the converter to an external structure such as, for example, a reciprocating conveyor 70 (see FIG. 16). It will be understood, in light of FIGS. 16 and 17, that the force transfer member 133 preferably engages the external structure (such as the conveyor 70) through a rotatable coupling that allows the force transfer member to rotate relative to the external structure (conveyor 70) while imparting a directed force to the external structure along a linearly reciprocating pathway. In some embodiments, the force transfer member also supports at least a portion of the weight of the external structure, and in other embodiments the weight of the external structure is supported by rolling supports 45 on support members 73 while the apparatus 100 is used for moving the external structure in a horizontally reciprocating mode.

It will be understood that while the apparatus 100 of the present invention is disclosed herein as a converter for converting rotary shaft power to linearly reciprocating motion of a conveyor 70, the apparatus 100 of the present invention may be employed to convert rotary shaft power to reciprocating other external structures in a reciprocating pathway, and that the scope of the invention is not limited to use with reciprocating conveyors.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus, comprising:
   a closure member having a passage there through, a pinion shaft rotatably received through the passage of the closure member, a pinion gear having a first diameter connected to a proximal end of the pinion shaft, a crank arm having an inboard end connected to a distal end of the pinion shaft and an outboard end radially offset from an axis of the pinion shaft and having a force transfer member;
   a case having an opening and an interior ring gear with a second diameter that is twice the first diameter, the opening adapted to engage the closure member;
   wherein upon engagement of the closure member with the opening, the pinion gear engages the interior ring gear of the case;
   wherein powered rotation of the closure member relative to the case revolves the pinion shaft about an axis of the interior ring gear and rotates the pinion gear about its axis to cause the force transfer member at the outboard end of the crank arm to reciprocate along a linear diametrical pathway; and
   wherein a reciprocating conveyor coupled to the force transfer member can be used to convey articles supported thereon.

2. The apparatus of claim 1, wherein the closure member engages a bearing supported on a landing surrounding the opening of the case;
   wherein at least a portion of a load on the force transfer member is supported by the landing of the case through the closure member.

3. The apparatus of claim 1, wherein the powered rotation of the closure member relative to the case is provided by securing the case and the interior ring gear, coupling the closure member to a motor and operating the motor to rotate the closure member relative to the case.

4. The apparatus of claim 1, further comprising:
   a bearing disposed intermediate the pinion shaft and the passage of the closure member to stabilize the pinion shaft.

5. The apparatus of claim 1, further comprising:
   a first mark on the interior ring gear; and
   a second mark on the pinion gear;
   a third mark on the closure member; and
   a fourth mark on the case;
   wherein the apparatus can be assembled by aligning the first mark with the second mark and the third mark with the fourth mark upon installing the closure member with the pinion shaft and the pinion gear onto the opening of the case with the interior ring gear.

* * * * *